United States Patent
Kwon et al.

(10) Patent No.: US 9,370,743 B2
(45) Date of Patent: Jun. 21, 2016

(54) CARBON DIOXIDE ADSORBENT INCLUDING BARIUM TITANATE, CARBON DIOXIDE CAPTURE MODULE INCLUDING THE SAME, AND METHODS FOR SEPARATING CARBON DIOXIDE USING THE SAME

(71) Applicant: Samsung Electronics Co., Ltd., Suwon-Si, Gyeonggi-Do (KR)

(72) Inventors: Soon Chul Kwon, Hwaseong-si (KR); Ji Ho Park, Daejeon (KR); Hyuk Jae Kwon, Suwon-si (KR); Yun Jung Park, Daejeon (KR); Hyun Chul Lee, Hwaseong-si (KR); Youn-Kyu Choi, Daejeon (KR)

(73) Assignees: Samsung Electronics Co., Ltd, Gyeonggi-Do (KR); Samsung Electro-Mechanics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/025,965

(22) Filed: Sep. 13, 2013

(65) Prior Publication Data

US 2014/0174292 A1    Jun. 26, 2014

(30) Foreign Application Priority Data

Dec. 21, 2012    (KR) .................. 10-2012-0151129

(51) Int. Cl.
  *B01D 53/02*    (2006.01)
  *B01D 53/04*    (2006.01)
  (Continued)

(52) U.S. Cl.
  CPC .............. *B01D 53/04* (2013.01); *B01D 53/02* (2013.01); *B01J 20/041* (2013.01); *B01J 20/06* (2013.01);
  (Continued)

(58) Field of Classification Search
  CPC .................. B01D 2253/1124; B01D 2253/25; B01D 2257/504; B01D 53/02; B01D 53/04; B01J 20/041; B01J 20/06; B01J 20/28007; B01J 20/28059; B01J 2220/66; Y02C 10/04; Y02C 10/08; Y02E 20/16; Y02E 20/18
  See application file for complete search history.

(56) References Cited

U.S. PATENT DOCUMENTS 7,042,707 B2 *   5/2006   Umeda et al. .............. 361/321.2
7,621,980 B2    11/2009   Saito et al.
(Continued)

FOREIGN PATENT DOCUMENTS

JP    2005272295 A    10/2005
JP    2007229602 A     9/2007
(Continued)

OTHER PUBLICATIONS

Kim et al., Sucrose-Derived Graphitic Porous Carbon Replicated by Mesoporous Silica, School of Environmental and Chemical Engineering, Chunbuk National University, Korean J. Chem, Eng., 23(6), 1063-1066, 2006.
(Continued)

*Primary Examiner* — Christopher P Jones
(74) *Attorney, Agent, or Firm* — Harness, Dickey & Pierce, P.L.C.

(57) ABSTRACT

A carbon dioxide adsorbent may include a complex oxide including barium and titanium, wherein the complex oxide has a perovskite crystalline structure and is represented by the general formula $Ba_xTi_yO_z$, and an atomic ratio of Ba/Ti ranges from about 0.95 to about 1.7. The carbon dioxide adsorbent may be included in a carbon dioxide capture module. The carbon dioxide adsorbent may also be used in a method of separating carbon dioxide.

15 Claims, 8 Drawing Sheets

(51) Int. Cl.
  B01J 20/06 (2006.01)
  B01J 20/28 (2006.01)
  B01J 20/04 (2006.01)

(52) U.S. Cl.
  CPC ...... B01J 20/28007 (2013.01); B01J 20/28059 (2013.01); *B01D 2253/1124* (2013.01); *B01D 2253/25* (2013.01); *B01D 2257/504* (2013.01); *B01J 2220/66* (2013.01); *Y02C 10/04* (2013.01); *Y02C 10/08* (2013.01); *Y02E 20/16* (2013.01); *Y02E 20/18* (2013.01)

(56) References Cited

U.S. PATENT DOCUMENTS

| | | | |
|---|---|---|---|
| 7,670,410 | B2 | 3/2010 | Saito et al. |
| 8,395,882 | B2 | 3/2013 | Suzuki et al. |
| 2002/0150531 | A1* | 10/2002 | Ohmori et al. ............ 423/598 |
| 2003/0044347 | A1* | 3/2003 | Shirakawa et al. ........ 423/598 |
| 2004/0115122 | A1 | 6/2004 | Jung et al. |
| 2004/0253172 | A1 | 12/2004 | Jung et al. |
| 2007/0125229 | A1 | 6/2007 | Saito et al. |
| 2013/0236726 | A1 | 9/2013 | Kwon et al. |
| 2013/0247757 | A1 | 9/2013 | Lee et al. |
| 2013/0260990 | A1 | 10/2013 | Kwon et al. |

FOREIGN PATENT DOCUMENTS

| | | |
|---|---|---|
| JP | 2010030861 A | 2/2010 |
| JP | 2012021125 A | 2/2012 |
| KR | 20020068792 A | 8/2002 |
| KR | 20030012222 A | 2/2003 |
| KR | 20030015011 A | 2/2003 |
| KR | 20030072761 A | 9/2003 |
| KR | 20050061697 A | 6/2005 |
| KR | 20050062788 A | 6/2005 |
| KR | 20050069432 A | 7/2005 |
| KR | 20080070981 A | 8/2008 |
| KR | 20090118748 A | 11/2009 |
| KR | 20100113847 A | 10/2010 |
| KR | 20100118803 A | 11/2010 |
| KR | 20100118804 A | 11/2010 |
| KR | 20100118805 A | 11/2010 |
| KR | 20110082859 A | 7/2011 |
| KR | 20120033128 A | 4/2012 |
| KR | 20130072761 A | 7/2013 |
| KR | 10-2013-0101936 | 9/2013 |
| KR | 10-2013-0109061 A | 10/2013 |
| KR | 10-2013-0109830 | 10/2013 |
| WO | WO-2010126253 A2 | 11/2010 |
| WO | WO-2012043904 A1 | 4/2012 |

OTHER PUBLICATIONS

Y. Ding et al., High Temperature Recovery of CO2 From Flue Gases Using Hydrotalcite Adsorbent, Institution of Chemical Engineers, Trans IChemE, vol. 79, Part B, Jan. 2001, pp. 45-51.

Martunus et al., Elevated Temperature Carbon Dioxide Capture Via Reinforced Metal Hydrotalcite, Microporous and Mesoporous Materials 138 (2011) pp. 110-117.

Soo Chool Lee et al., Development of New Alumina-Modified Sorbents for CO2 Sorption and Regeneration At Temperatures Below 200?C, Fuel 90 (2011) 1465-1470.

Meis et al., On the Influence and Role of Alkali Metals on Supported and Unsupported Activated Hydrotalcites for CO2 Sorption, Ind. Eng. Chem. Res. 2010, 49, 8086-8093.

\* cited by examiner

US 9,370,743 B2

CARBON DIOXIDE ADSORBENT INCLUDING BARIUM TITANATE, CARBON DIOXIDE CAPTURE MODULE INCLUDING THE SAME, AND METHODS FOR SEPARATING CARBON DIOXIDE USING THE SAME

CROSS-REFERENCE TO RELATED APPLICATION

This application claims priority under 35 U.S.C. §119 to Korean Patent Application No. 10-2012-0151129, filed in the Korean Intellectual Property Office on Dec. 21, 2012, the entire contents of which are incorporated herein by reference.

BACKGROUND

1. Field

Example embodiments herein relate to a carbon dioxide adsorbent including barium titanate, a carbon dioxide capture module including the same, and a method of separating carbon dioxide.

2. Description of the Related Art

A considerable increase in the concentration of the global atmospheric $CO_2$, one of the greenhouse gases, has raised concern about climate change and has led to increasing efforts in research and development on control of $CO_2$ emissions. The main $CO_2$ emission sources include fossil fuel-based power plants, vehicles, and manufacturing plants for cement, limestone, hydrogen, ammonia, and the like. Capture and separation of carbon dioxide from fixed facilities such as various power plants or factories are considered as the first measure for the control of carbon dioxide emissions. The capture of carbon dioxide refers to a process of physically or chemically separating $CO_2$ among a gas mixture generated from chemical reactions or combustion of fossil fuels. In order to capture $CO_2$ by adsorption, carbon materials, zeolites, metal-organic composite materials (MOF), or the like may be used. Although they show a certain level of adsorption efficiency at a low temperature of less than 200° C., they have difficulties in being used for carbon dioxide adsorption in a higher temperature environment. However, among fixed $CO_2$-emission facilities emitting a considerable amount of carbon dioxide are fossil fuels-based power plants (e.g., an integrated gasification combined cycle (IGCC) system or a thermoelectric power plant) and natural gas wells, which require adsorbent materials that may adsorb carbon dioxide at a relatively high temperature, for example, about 200 to 550° C., and that are also of sufficient durability so as to be able to withstand such a high temperature environment.

SUMMARY

Some example embodiments relate to a carbon dioxide adsorbent including a complex oxide including barium (Ba) and titanium (Ti).

Some example embodiments relate to a method of removing carbon dioxide using the carbon dioxide adsorbent.

According to one example embodiment, a carbon dioxide adsorbent may include a complex oxide including barium and titanium, wherein the complex oxide has a perovskite crystalline structure and is represented by a general formula $Ba_xTi_yO_z$, and an atomic ratio of Ba/Ti (x/y) ranges from about 0.95 to about 1.7.

The complex oxide may have a specific surface area of greater than or equal to about 6 $m^2/g$. The complex oxide may have an average particle size of less than or equal to about 150 nm.

According to another example embodiment, a carbon dioxide capture module including the carbon dioxide adsorbent is provided.

According to yet another example embodiment, a method of capturing carbon dioxide may include contacting a carbon dioxide adsorbent with a gas mixture including carbon dioxide at a temperature of greater than or equal to about 30° C., wherein the carbon dioxide adsorbent includes a complex oxide including barium and titanium, the complex oxide has a perovskite crystalline structure, is represented by the general formula $Ba_xTi_yO_z$, and has an atomic ratio (Ba/Ti) of Ba and Ti ranging from about 0.95 to about 1.7.

According to still another example embodiment, a method of separating carbon dioxide may include a) providing a carbon dioxide capture module filled with a carbon dioxide adsorbent, wherein the carbon dioxide adsorbent includes a complex oxide including barium and titanium, the complex oxide has a perovskite crystalline structure and is represented by the general formula $Ba_xTi_yO_z$, and an atomic ratio (Ba/Ti) of Ba and Ti ranges from about 0.95 to about 1.7; b) supplying an input gas stream including carbon dioxide to the carbon dioxide capture module; c) contacting the carbon dioxide adsorbent with the input gas stream to capture carbon dioxide; and d) emitting the input gas stream from the carbon dioxide capture module.

The method of separating the carbon dioxide may further include e) stopping supply of the input gas stream including carbon dioxide to the carbon dioxide capture module; and f) heat-treating the carbon dioxide adsorbent with carbon dioxide captured therein at a temperature of about 50° C. to about 700° C. to desorb the captured carbon dioxide and emitting the same.

The input gas stream may further include at least one gas selected from hydrogen, nitrogen, and methane.

DETAILED DESCRIPTION

Figure 1:
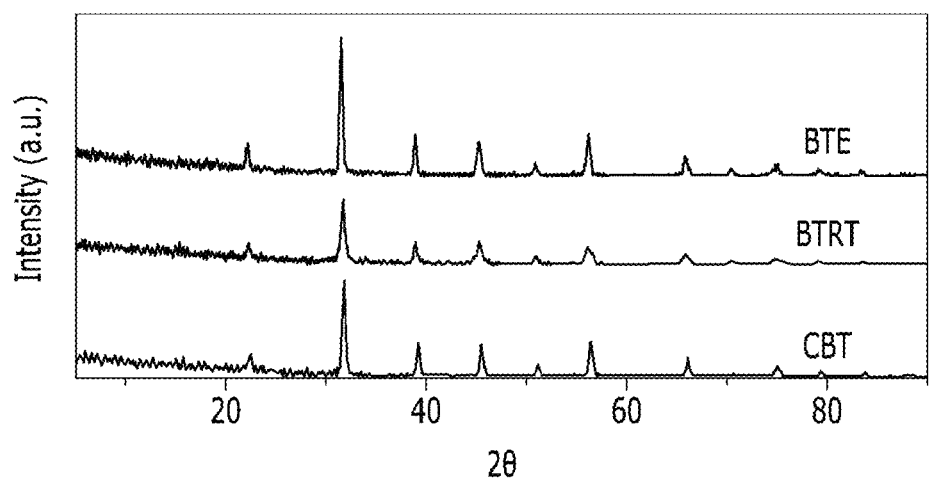
FIG. 1 shows an X-ray diffraction spectrum of barium titanate (BTE) of Preparation Example 1, barium titanate (BTRT) of Preparation Example 2, and barium titanate (CBT) as used in Example 1.

The advantages and characteristics of the present disclosure, and the method of achieving them, will be more clearly understood when the following description is read with reference to the accompanying drawings and example embodiments. However, it should be understood that the present disclosure is not limited to the following example embodiments, but instead may be realized with different embodiments. The example embodiments have merely been provided to aid the understanding of a person having ordinary knowledge in the art, and the present disclosure is defined by the claims. Thus, in some example embodiments, well-known technologies may not have been explained in detail in the interest of brevity. Unless otherwise defined, all terms used in the specification (including technical and scientific terms) may be used with meanings commonly understood by a person having ordinary knowledge in the art. Further, unless explicitly defined otherwise, the terms defined in a generally-used dictionary are not ideally or excessively interpreted. In addition, unless explicitly described to the contrary, the words "comprise" and "include" and variations such as "comprises," "comprising," "includes," or "including" will be understood to imply the inclusion of stated elements but not the exclusion of any other unstated elements.

Unless specifically described to the contrary, a singular form includes a plural form.

The example embodiments described in the specification may have been explained with reference to idealized drawings or schematic views. Therefore, the parts shown in the drawings may have outline properties and are not to limit the present disclosure. The same reference numerals designate the same constituent elements throughout the specification.

As used herein, the term "input gas stream" refers to a gas stream prior to passing through a packed bed reactor filled with an adsorbent or prior to initial contact with the adsorbent.

A carbon dioxide adsorbent according to one example embodiment may include a complex oxide including barium and titanium, wherein the complex oxide has a perovskite crystalline structure, is represented by a general formula $Ba_xTi_yO_z$, and has an atomic ratio of Ba/Ti (x/y) ranging from about 0.95 to about 1.7. Herein, z is a number necessary for balancing charges between metal elements and oxygen in a given complex oxide.

The complex oxide included in the carbon dioxide adsorbent may adsorb/desorb carbon dioxide, for example, according to the following Reaction Scheme 1.

$BaTiO_3 + CO_2$ 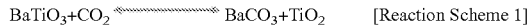 $BaCO_3 + TiO_2$ [Reaction Scheme 1]

In other words, carbon dioxide, which is weak-acidic, may be adsorbed onto the barium titanate complex oxide that includes barium, the alkaline-earth metal, via Reaction Scheme 1. Barium is an element having the highest basicity among alkali metals, and thus has a relatively high affinity to carbon dioxide. In addition, since the Gibbs free energy (ΔG) of the reaction is less than 0 in a relatively high temperature range, for example, at a temperature of less than or equal to about 800° C., carbon dioxide may be effectively captured (i.e., by physical adsorption and/or chemical adsorption) in a temperature range from about 200° C. to about 550° C. of thermoelectric power plant or the like. In particular, as the heat of adsorption necessary for adsorbing carbon dioxide is low, the energy required for regeneration is also low.

The complex oxide of the carbon dioxide adsorbent may be represented by the general formula $Ba_xTi_yO_z$, and has an atomic ratio of Ba/Ti (x/y) of about 0.95 to about 1.70, specifically about 0.97 to about 1.60, more specifically about 0.98 to about 1.50, and even more specifically about 0.99 to about 1.20.

In particular, when the Ba/Ti atomic ratio is greater than or equal to about 1.01, the carbon dioxide adsorption capacity at about 200° C. to about 550° C. may sharply increase. The complex oxide included in the carbon dioxide adsorbent includes barium titanate having a perovskite crystalline structure. The barium titanate having such crystalline structure is stable particularly against heat, and thus it may exhibit high durability even when being used as a carbon dioxide adsorbent in high-temperature environment.

The barium titanate complex oxide may have a form of a fine particle with an average particle size less than or equal to about 150 nm, specifically, less than or equal to about 100 nm, more specifically, less than or equal to about 90 nm, and even more specifically, less than or equal to about 80 nm, for example, about 10 nm to about 70 nm. In addition, it may have such a uniform particle size that the relative standard deviation of the particle size may be less than or equal to about 10%, and specifically, less than or equal to about 8%. In addition, the complex oxide may have a specific surface area of greater than or equal to about 6 $m^2/g$, specifically, greater than or equal to about 20 $m^2/g$, and more specifically, greater than or equal to about 25 $m^2/g$. When the particle size is less than or equal to about 80 nm and/or when the specific surface area is greater than or equal to about 20 $m^2/g$, the adsorbent may provide more active reaction sites for adsorbing carbon dioxide, leading to a higher level of carbon dioxide adsorption efficiency.

Unlike the conventional barium titanate ($BaTiO_3$) being used in electronic parts as a dielectric material or a piezoelectric material in a multi-layer ceramic capacitor (MLCC) or the like, the barium titanate complex oxide being used for a carbon dioxide adsorbent has a surface area within the aforementioned range together with the Ba/Ti atomic ratio within the aforementioned range, and thus it may efficiently adsorb carbon dioxide and have a relatively high level of $CO_2$ capture capacity. The barium titanate having the large specific surface area and the high Ba/Ti content may be prepared by a suitable method, for example, by co-precipitation or hydrothermal synthesis. By way of non-limiting examples, a complex oxide including $BaTiO_3$ having the aforementioned characteristics may be prepared according to the method including the following steps:

a) preparing a Ba precursor and a Ti precursor respectively;
b) adding the Ba precursor into a pressure reactor;
c) mixing a solution of the Ti precursor with the Ba precursor in the reactor under a nitrogen atmosphere;
d) reacting the obtained mixture at a temperature of about 60° C. to about 280° C. under a pressure of about 1 bar to about 180 bar for about 5 hours to about 96 hours to obtain a complex oxide including barium titanate; and
e) filtering the obtained complex oxide and drying the same.

Specific examples of the Ba precursor may include, but are not limited to, barium chloride, barium hydroxide, barium sulfate, barium carbonate, and barium acetate. A solution of the Ba precursor is prepared by dissolving the Ba precursor in water at about 80° C. Specific examples of the Ti precursor may include, but are not limited to, a titanium oxide such as titanium dioxide, titanium alkoxide, titanium halide, titanium hydroxide, and the like. The Ti precursor may be prepared by obtaining an aqueous solution of a titanium salt such as $TiCl_4$ or titanium alkoxide and adding an alkali thereto to provide a titanium hydroxide solution. The Ti precursor may be mixed with the barium precursor solution. When the aqueous solution of the Ba precursor and the solution of the Ti precursor are mixed, an organic compound such as a surfactant may be added thereto. The Ba precursor aqueous solution and the Ti precursor solution may be mixed at such an amount to provide a Ba/Ti atomic ratio ranging from about 1.02 to 2.00, specifically, ranging from about 1.05 to 1.50, and more specifically, ranging from about 1.05 to 1.20. The concentration of the Ba precursor aqueous solution is not particularly limited and may be appropriately selected. By way of non-limiting examples, the concentration of the Ba precursor may range from about 0.05 mol/L to about 2.0 mol/L, and specifically, from about 0.1 mol/L to about 1.2 mol/L. The concentration of the Ti precursor solution may range from about 0.05 mol/L to about 5.5 mol/L, and specifically, from about 0.1 mol/L to about 2.0 mol/L.

The hydrothermal treatment of the precursor mixture obtained from step c) may be performed at a temperature of about 60° C. to about 300° C., specifically, at a temperature of about 70° C. to about 280° C., and more specifically, at a temperature of about 80° C. to about 250° C. The time of the hydrothermal treatment is not particularly limited, but it may be, for example, about 5 hours or longer, specifically, about 5 hours to about 96 hours, and more specifically, about 12 hours to about 48 hours.

The complex oxide obtained from step d) is filtered and then may be washed and dried. The drying may be performed at a temperature of about 80° C. to about 150° C. under an air atmosphere for about 6 hours to about 24 hours.

The carbon dioxide adsorbent may exhibit a $CO_2$ capture capacity of greater than or equal to about 3.5 wt %, specifically, greater than or equal to about 4.0 wt %, more specifically, greater than or equal to about 5.9 wt %, and even more specifically, greater than or equal to about 10.1 wt %, as determined from the total $CO_2$ capacity (i.e., the total amount of $CO_2$ that the adsorbent may adsorb) in a breakthrough curve at a temperature of about 190° C. to about 400° C.

The carbon dioxide adsorbent may exhibit a $CO_2$ capture capacity (i.e., 90% BP carbon dioxide adsorption capacity) of greater than or equal to about 2.5 wt %, specifically greater than or equal to about 2.7 wt %, more specifically, greater than or equal to about 4.1 wt %, and even more specifically, greater than or about 8.8 wt %, as determined based on 90% breakthrough point (BP) of a breakthrough curve at an adsorption temperature of about 190° C. to about 400° C.

According to another example embodiment, a method of capturing carbon dioxide may include contacting a carbon dioxide adsorbent with a gas mixture including carbon dioxide, wherein the carbon dioxide adsorbent includes a complex oxide including barium and titanium, and the complex oxide has a perovskite crystalline structure and its general formula is $Ba_xTi_yO_z$, and an atomic ratio (Ba/Ti) of Ba and Ti ranges from about 0.95 to about 1.7.

Details for the carbon dioxide adsorbent including the complex oxide may be the same as described above. In addition to carbon dioxide, the gas mixture may further include hydrogen, a hydrocarbon such as methane, nitrogen, or a combination thereof. The carbon dioxide adsorbent may be brought into contact with the gas mixture at a temperature of greater than or equal to about 25° C., and specifically, about 30° C. to about 400° C. According to another example embodiment, a method of separating carbon dioxide may include a) providing a carbon dioxide capture module filled with a carbon dioxide adsorbent, wherein the carbon dioxide adsorbent includes a complex oxide including barium and titanium, and the complex oxide has a perovskite crystalline structure and has the general formula $Ba_xTi_yO_z$, and an atomic ratio (Ba/Ti) of Ba and Ti ranges from about 0.95 to about 1.7; b) supplying an input gas stream including carbon dioxide to the carbon dioxide capture module; c) contacting the carbon dioxide adsorbent with the input gas stream to capture and separate carbon dioxide; and d) emitting the input gas stream from the carbon dioxide capture module.

The method of separating carbon dioxide may further include e) stopping supply of the input gas stream including carbon dioxide to the carbon dioxide capture module; and f) heat-treating the carbon dioxide adsorbent at a temperature of about 50° C. to about 700° C. to desorb carbon dioxide and emitting the same.

The carbon dioxide capture module may include an adsorption layer including the carbon dioxide adsorbent, a support plate supporting the adsorption layer, and a housing including an inlet for an input gas stream and an outlet for the treated gas stream. Details for the carbon dioxide adsorbent including the complex oxide may be the same as described above. The thickness of the adsorption layer is not particularly limited, but may be greater than or equal to about 0.2 cm, and specifically from about 0.5 cm to about 3 cm. The support plate may be made of any materials as long as they support the adsorbent while allowing the flow of the input gas. Examples of the material may include quartz wool or the like. Materials and shapes of the housing for the module are not particularly limited, but may be selected as needed. By way of non-limiting examples, the housing may be made of stainless steel, copper pipe, or quartz pipe, and may have a shape of cylinder, a prism, or the like.

The input gas stream may further include at least one gas selected from hydrogen, nitrogen, and methane. The composition of the input gas stream is not particularly limited, but may be appropriately selected as needed. For example, the input gas stream may include carbon dioxide and nitrogen like a flue gas generated from a fossil fuel power plant. The inflow stream may include carbon dioxide and hydrogen like a flue gas generated from an integrated gasification combined cycle (IGCC) power plant. The input gas stream may include carbon dioxide and methane like a gas generated from a natural gas well. The flow rate of supplying the input gas stream is not particularly limited, but may be appropriately selected as required. For example, the feeding flow rate may be less than or equal to about 1000 ml/min, and specifically, less than or equal to about 500 ml/min.

The carbon dioxide adsorbent may adsorb carbon dioxide at high efficiency even at a high temperature of 200° C. or higher as described above. Since the complex oxide included in the adsorbent is thermally stable, the decrease in $CO_2$ adsorption capacity of the adsorbent may be less than about 10% even after repeating 10 times of the adsorption at 200° C./desorption at 200° C. and under 1 bar of pressure.

The following illustrates example embodiments of the present disclosure in more detail. However, it should be understood that this disclosure is not to be limited thereto.

EXAMPLES

Preparation of Barium Titanate

Preparation Example 1

0.8 mol (based on the Ti amount) of $TiCl_4$, is dissolved in water and 18.9 g of an ammonia aqueous solution (5 wt %) is added thereto to provide a titanium hydroxide gel. 73.6 g of Ba $(OH)_2.8H_2O$ is dissolved in water at 80° C. to provide an aqueous solution of barium hydroxide. The aqueous solution of barium hydroxide is introduced into a pressure reactor, which is then filled with nitrogen. The titanium hydroxide gel as obtained above is added dropwise to the barium hydroxide aqueous solution under the nitrogen atmosphere to prepare a slurry. The slurry is stirred and aged at 60° C. for 30 minutes and then is subjected to a hydrothermal synthesis in the pressure reactor at 250° C. for 48 hours. After the reaction, the reaction slurry is cooled to room temperature, and then is washed and filtered under the nitrogen environment and is dried at 105° C. for 12 hours to provide barium titanate (hereinafter referred to as BTE).

Figure 2:
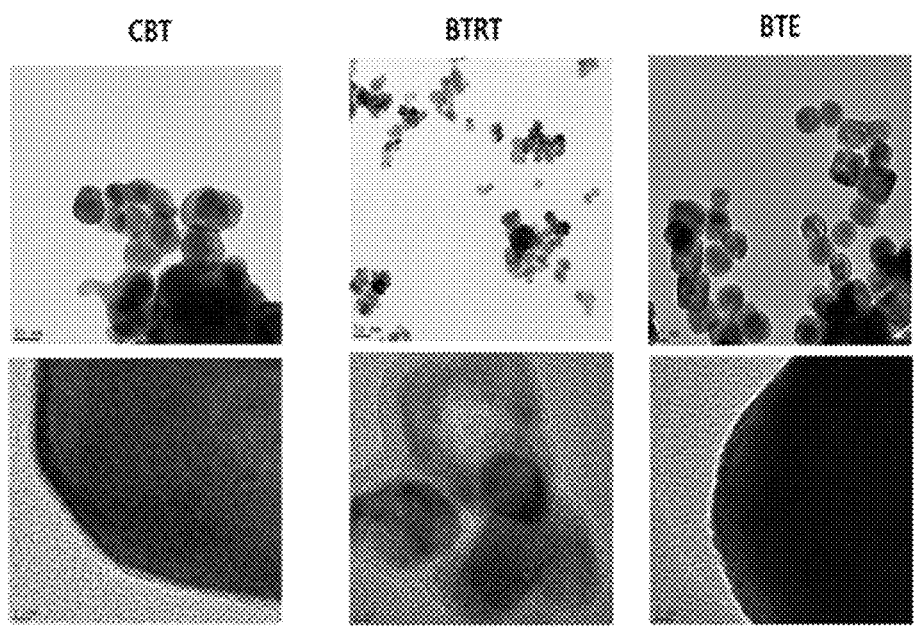
FIG. 2 shows transmission electron microscope (TEM) images of barium titanate (BTE) of Preparation Example 1, barium titanate (BTRT) of Preparation Example 2, and barium titanate (CBT) as used in Example 1.

The X-ray diffraction spectrum of BTE is obtained by using an X-ray diffractometer, and the results are shown in FIG. 1. FIG. 1 shows that the BTE has a typical crystalline structure of $BaTiO_3$. The BET adsorption test is conducted under the nitrogen condition, and the specific surface area BTE is measured. The results are shown in Table 1. The average size of particles is measured using the Barrett-Joyner-Halenda (BJH) method, and the results are also shown in Table 1. The Ba/Ti atomic ratio is measured according to the inductively coupled plasma atomic emission spectroscopy (ICP-AES) manner, and the results are obtained from the weight ratio and are shown in Table 1. In addition, TEM analysis is performed on the BTE, and the results are shown in FIG. 2. From FIG. 2, it is understood that the BTE is a mixture having a circular/quadrangular particle shape.

Preparation Example 2

A barium titanate (hereinafter referred to as BTRT) is prepared in the same manner as set forth in Example 1, except that the atomic ratio of Ba/Ti is 0.9980.

FIG. 1 shows an X-ray diffraction spectrum of the obtained BTRT using the X-ray diffractometer (trade name: Phillips XPert PRO). The BET adsorption test is performed under the nitrogen condition to measure the specific surface area BTRT. The results are shown in Table 1. Using the Barrett-Joyner-Halenda (BJH) method (measuring particle size from a TEM photograph and calculating from the crystal peak width with XRD), the particle size range of BTRT is measured, and the results are also shown in Table 1. The Ba/Ti atomic ratio is measured according to the inductively coupled plasma atomic emission spectroscopy (ICP-AES) manner, and the results are obtained from the weight ratio and shown in Table 1. In addition, TEM analysis (TEM device name: Tecnai G2 TEM (FED) is performed on the BTRT, and the results are shown in FIG. 2. From FIG. 2, it is understood that BTRT has a spherical particle shape.

Fabrication of Adsorbent Module Including Barium Titanate and Carbon Dioxide Adsorption Test Using the Same:

Example 1

Figure 3:
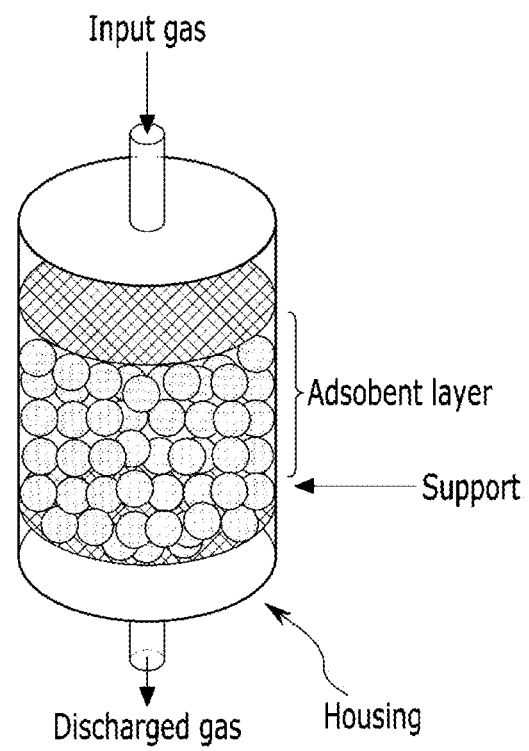
FIG. 3 is a schematic view of the carbon dioxide capture module according to one example embodiment as used in Examples 1 to 3.
Figure 4:
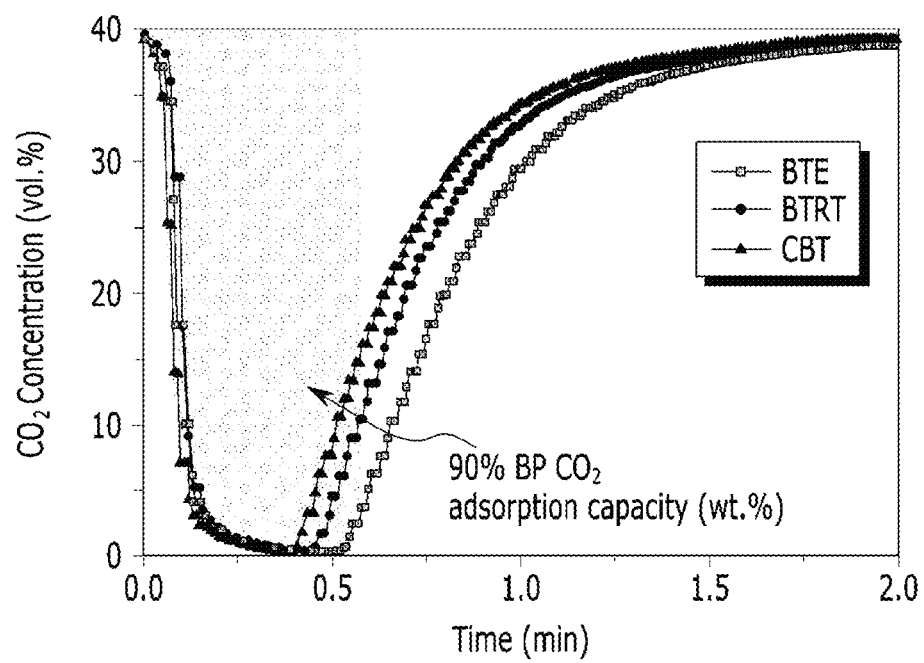
FIG. 4 shows breakthrough curves illustrating the results of the carbon dioxide adsorption tests conducted in Examples 1 to 3.

$CO_2$ Adsorption Test Using Barium Titanate Commercially Available (1) Barium titanate (trade name: Barium Titanate, hereinafter referred to as CBT) from Sigma Aldrich is used as a carbon dioxide adsorbent to fabricate a carbon dioxide capture module having the structure shown in FIG. 3. Using the same, a carbon dioxide adsorption test is performed under the following conditions to provide a carbon dioxide concentration profile. The breakthrough curve is shown in FIG. 4.

Composition of input gas stream: 40% $CO_2$+60% $H_2$
Total flow rate: 200 mL/min
Weight of the filled adsorbent: 0.25 g
Thickness of the adsorption layer: 0.5 cm
Adsorption temperature: 200° C.

For the barium titanate, analyses are made for its X-ray diffraction spectrum, the specific surface area, and the average particle size, and the Ba/Ti atomic ratio is measured via the ICP-AES manner in the same manner as set forth in Preparation Example 1 and Preparation Example 2, and the results are shown in FIG. 1 and Table 1. In addition, the TEM analysis is made on the CBT, and the results are shown in FIG. 2. FIG. 2 shows that the CBT is a mixture of circular/quadrangular shaped particles.

TABLE 1

| Complex oxide of adsorbent | Specific surface area (m$^2$/g) | Ba/Ti atomic ratio | Particle size (nm) |
|---|---|---|---|
| CBT | 6 | 0.9724 | 50-200 |
| BTRT | 45 | 0.9980 | 10-30 |
| BTE | 27 | 1.0131 | 30-70 |

The total carbon dioxide adsorption capacity and the 90% BP carbon dioxide adsorption capacity are calculated from the breakthrough curve of FIG. 4, and the results are shown in the following Table 2.

Figure 5:
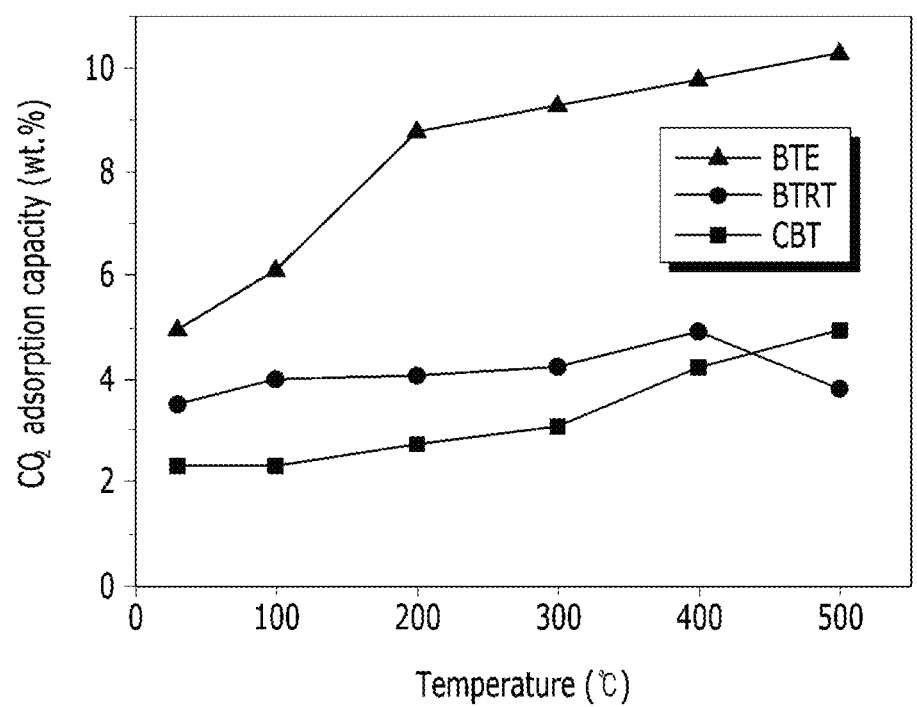
FIG. 5 illustrates graphs plotting carbon dioxide adsorption efficiency of Examples 1 to 3 at different temperatures.

(2) The carbon dioxide adsorption test is performed using the aforementioned $CO_2$ capture module under the same conditions described in section (1) except for increasing the adsorption temperature from 30° C. to 500° C., and a 90% BP carbon dioxide adsorption capacity is calculated. The results are shown in FIG. 5.

Example 2

Carbon Dioxide Adsorption Test Using BTRT (1) A carbon dioxide capture module is fabricated in the same manner as set forth in Example 1, except for using the BTRT obtained from Preparation Example 2 as a carbon dioxide adsorbent, and the carbon dioxide adsorption test is performed in the same manner as set forth in Example 1 to provide a carbon dioxide concentration profile. The breakthrough curve is shown in FIG. 4.

The total carbon dioxide adsorption capacity and the 90% BP carbon dioxide adsorption capacity are calculated from the breakthrough curve shown in FIG. 4, and the results are shown in the following Table 2.

(2) The carbon dioxide adsorption test is conducted using the aforementioned carbon dioxide capture module under the same conditions as set forth in section (1) except for increasing the adsorption temperature from 30° C. to 500° C. to provide a 90% BP carbon dioxide adsorption capacity. The results are shown in FIG. 5.

Example 3

Carbon Dioxide Adsorption Test Using BTE (1) A carbon dioxide capture module is fabricated in the same manner as set forth in Example 1, except for using the BTE obtained from Preparation Example 1 as the carbon dioxide adsorbent, and the carbon dioxide adsorption test is performed in accordance with the same manner as in Example 1 to provide a carbon dioxide concentration profile. The breakthrough curve is shown in FIG. 4.

The total carbon dioxide adsorption capacity and the 90% BP carbon dioxide adsorption capacity are calculated from the breakthrough curve shown in FIG. 4, and the results are shown in the following Table 2.

(2) The carbon dioxide adsorption test is conducted using the aforementioned carbon dioxide capture module under the same conditions as set forth in section (1) except for increasing the adsorption temperature from 30° C. to 500° C. to provide a 90% BP carbon dioxide adsorption capacity. The results are shown in FIG. 5.

TABLE 2

|  | Example 1 (CBT) | Example 2 (BTRT) | Example 3 (BTE) |
|---|---|---|---|
| Total adsorption capacity (wt %) | 4.0 | 5.9 | 10.1 |
| 90% BP CO$_2$ adsorption capacity (wt %) | 2.7 | 4.1 | 8.8 |

As shown in Table 2, the adsorbents of Examples 1 to 3 have adsorption capacity higher than a certain level even at a high temperature of 200° C., and the adsorbents obtained from Example 2 and Example 3 show a particularly high adsorption capacity. The results of FIG. 5 show that the adsorbents of Examples 1 to 3 have adsorption capacity higher than a certain level even at a temperature of greater than or equal to 200° C., particularly, even at a high temperature of 500° C.; and the adsorbent of Example 3 exhibit a particularly high adsorption capacity as high as 10 wt %.

Example 4-1 to 4-3

Carbon Dioxide Adsorption Test of Input Gas Streams Having Different Compositions The carbon dioxide capture module is fabricated in the same manner as set forth in Example 1, except for using BTRT obtained from Preparation Example 2 as a carbon dioxide adsorbent. The carbon dioxide adsorption test is performed with the composition of input gas stream and the adsorption conditions as follows to calculate the carbon dioxide adsorption capacity, and the results are shown in FIG. 6.

In the case of Example 4-1, 40% CO$_2$+60% N$_2$; in the case of Example 4-2, 40% CO$_2$+60% CH$_4$; and in the case of Example 4-3, 40% CO$_2$+60% H$_2$.

Total flow rate: 200 mL/min
Weight of the filled adsorbent: 0.25 g
Thickness of the adsorption layer: 0.5 cm
Adsorption temperature: 200° C.

Figure 6:
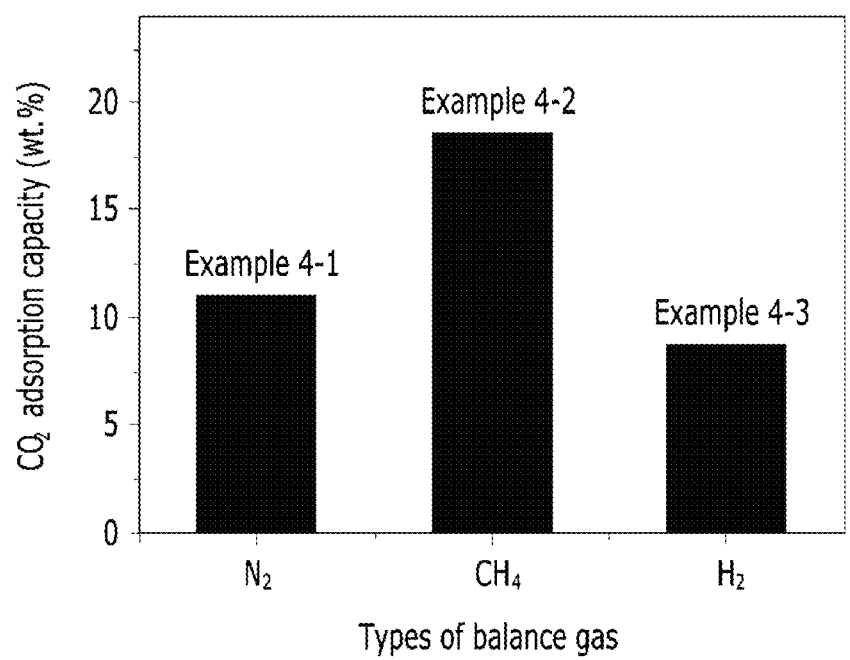
FIG. 6 illustrates a bar graph showing the results of Examples 4-1 to 4-3.

The results of FIG. 6 confirm that the carbon dioxide capture module including BTRT has a high adsorption capacity even at a high temperature regardless of the types of gases as mixed. Accordingly, the adsorbent module may effectively separate carbon dioxide from the flue gas produced from various power plants or the gas generated from natural gas wells.

Example 5

Durability Test for Carbon Dioxide Capture Module (1) Using the carbon dioxide capture module obtained from Example 1 (adsorbent module using CBT), the carbon oxide capture module obtained from Example 2 (adsorbent module using BTRT), and the carbon dioxide capture module obtained from Example 3 (adsorbent module using BTE), the carbon dioxide adsorption and desorption cycle is repeated 10 times under the following conditions, and the carbon dioxide adsorption capacity is calculated for each cycle. The results are shown in FIG. 7.

Composition of the input gas stream: 40% CO$_2$+60% H$_2$
Total flow rate: 200 mL/min
Weight of the filled adsorbent: 0.25 g
Thickness of the adsorption layer: 0.5 cm
Adsorption temperature: 200° C.

Figure 7:
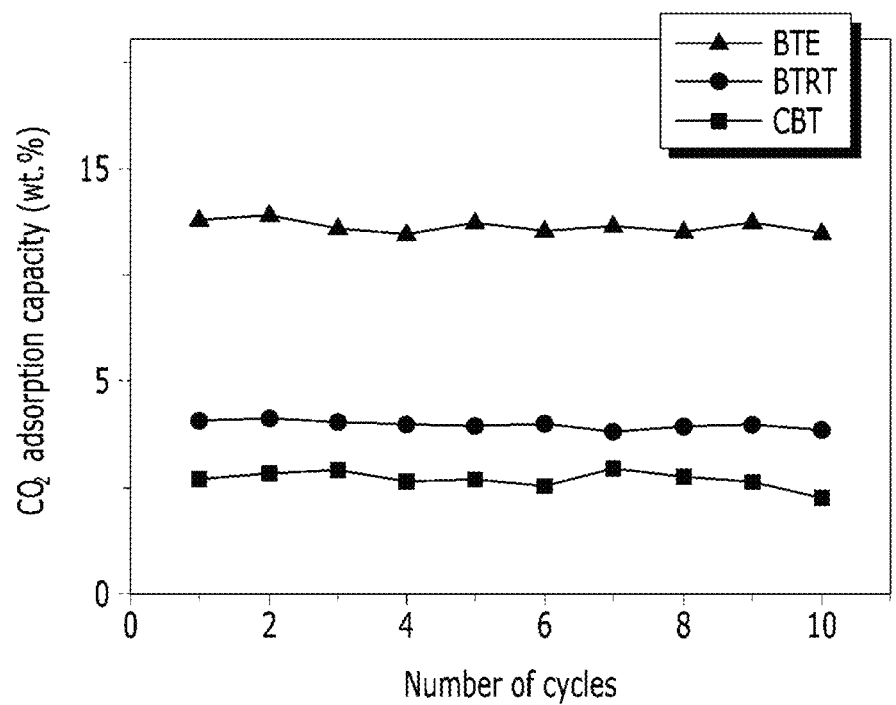
FIG. 7 shows graphs plotting the adsorption capacity of the carbon dioxide capture module over a predetermined number of cycles when 10 times of the adsorption and desorption being carried out with using the carbon dioxide capture modules fabricated in Examples 1 to 3.

The results of FIG. 7 confirm that the adsorbent modules fabricated in Examples 1 to 3 exhibit a desirable level of durability even when being used at a high temperature.

Figure 8:
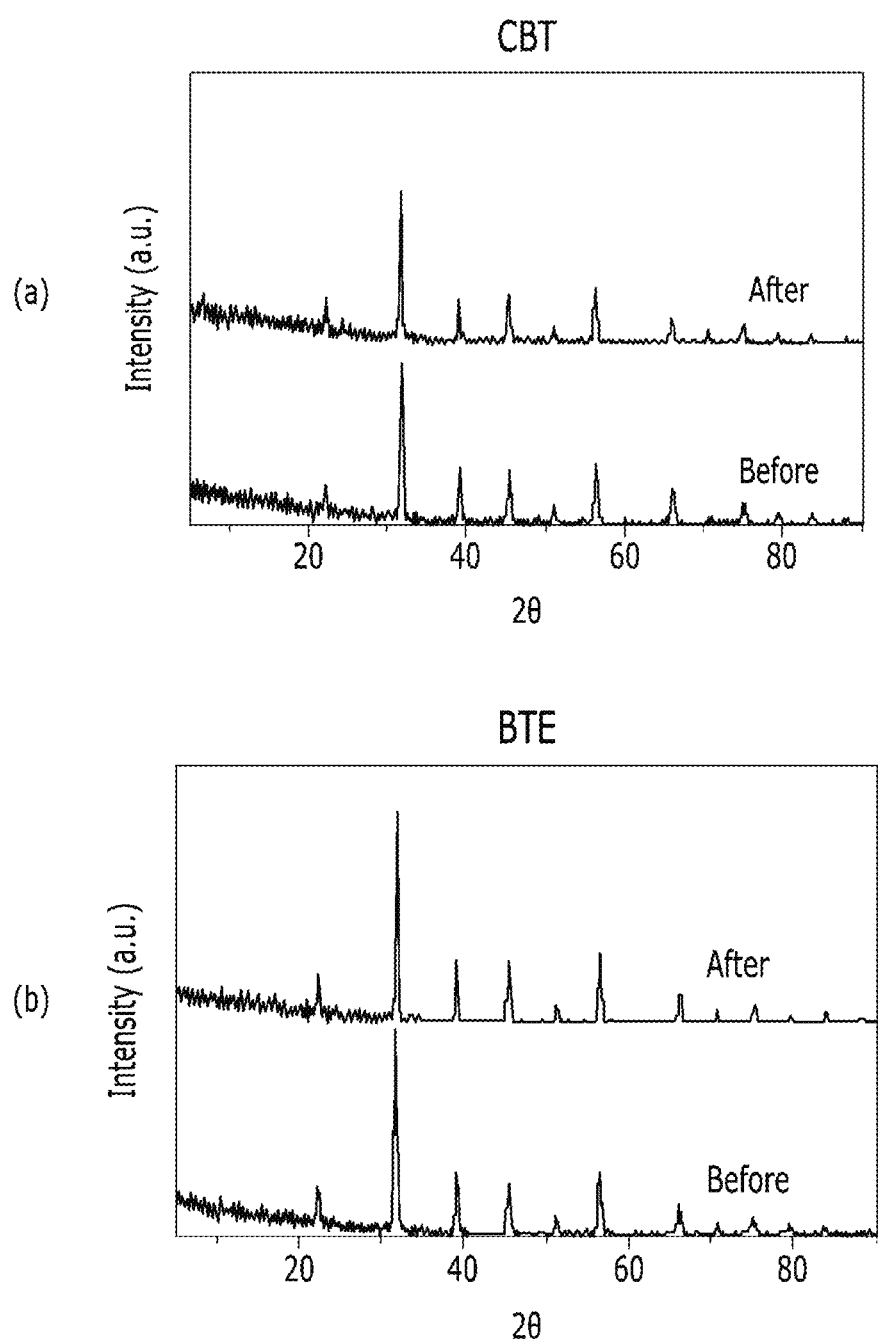
FIG. 8 shows an X-ray diffraction spectrum of the complex oxide (CBT, BTE) prior to an adsorption test and after performing the adsorption/desorption test 10 times for the carbon dioxide capture modules obtained from Example 1 (CBT) and Example 3 (BTE).

(2) An X-ray diffraction Analysis is made for the carbon dioxide capture module obtained from Example 1 (adsorbent module using CBT) and the carbon dioxide capture module obtained from Example 3 (adsorbent module using BTE) prior to the adsorption test and after the adsorption/desorption being carried out 10 times, and their X-ray diffraction spectrums are shown in FIG. 8.

The results of FIG. 8 show that no substantial change occurs in the crystalline structure prior to and after the use of the carbon dioxide capture module obtained from Example 1 and Example 3.

While various example embodiments are described herein, it should be understood that the disclosure is not limited thereto, but, on the contrary, is intended to cover various modifications and equivalent arrangements included within the spirit and scope of the appended claims.

What is claimed is:

1. A carbon dioxide adsorbent comprising:
a complex oxide including barium and titanium, the complex oxide having a perovskite crystalline structure and represented by Ba$_x$Ti$_y$O$_z$, an atomic ratio of Ba/Ti ranging from about 0.95 to about 1.70, the complex oxide having a specific surface area of greater than or equal to about 20 m$^2$/g and an average particle size of less than or equal to about 70 nm as measured by Barrett-Joyner-Halenda (BJH) method.

2. The carbon dioxide adsorbent of claim 1, wherein the atomic ratio of Ba/Ti ranges from about 0.97 to about 1.05.

3. The carbon dioxide adsorbent of claim 1, wherein the average particle size ranges from about 10 nm to about 70 nm.

4. The carbon dioxide adsorbent of claim 1, wherein the carbon dioxide adsorbent has a 90% BP carbon dioxide adsorption capacity of greater than or equal to about 2.7 wt % at a temperature of about 190° C. to about 400° C.

5. The carbon dioxide adsorbent of claim 1, wherein the atomic ratio of Ba/Ti ranges from about 1.01 to about 1.70.

6. A carbon dioxide capture module, comprising:
an adsorption layer including a carbon dioxide adsorbent, the carbon dioxide adsorbent including a complex oxide including barium and titanium, the complex oxide having a perovskite crystalline structure and represented by Ba$_x$Ti$_y$O$_z$, an atomic ratio of Ba/Ti ranging from about 0.95 to about 1.7, the complex oxide having a specific surface area of greater than or equal to about 20 m$^2$/g and an average particle size of less than or equal to about 70 nm as measured by Barrett-Joyner-Halenda (BJH) method;
a support plate supporting the adsorption layer; and
a housing including an inlet and an outlet, the inlet configured to introduce an input gas stream, the outlet configured to emit a treated gas stream.

7. The carbon dioxide capture module of claim 6, wherein the atomic ratio of Ba/Ti ranges from about 0.99 to about 1.05, and the ranges from about 10 nm to about 70 nm.

8. The carbon dioxide capture module of claim 6, wherein the adsorption layer has a thickness of greater than or equal to about 0.2 cm.

9. A method of separating carbon dioxide, comprising:
preparing a carbon dioxide capture module filled with a carbon dioxide adsorbent, the carbon dioxide adsorbent including a complex oxide, the complex oxide including barium and titanium, the complex oxide having a perovskite crystalline structure and represented by $Ba_xTi_yO_z$, an atomic ratio of Ba/Ti ranging from about 0.95 to about 1.7, the complex oxide having a specific surface area of greater than or equal to about 20 $m^2/g$ and an average particle size of less than or equal to about 70 nm as measured by Barrett-Joyner-Halenda (BJH) method;

supplying an input gas stream including carbon dioxide to the carbon dioxide capture module;

contacting the carbon dioxide adsorbent with the input gas stream at a temperature of greater than or equal to about 30° C. to adsorb carbon dioxide onto a surface of the carbon dioxide adsorbent; and emitting the input gas stream from the carbon dioxide capture module.

10. The method of claim 9, further comprising:

stopping the input gas stream to the carbon dioxide capture module; and heat-treating the carbon dioxide adsorbent at a temperature of about 50° C. to about 700° C. to desorb the carbon dioxide from the surface of the carbon dioxide adsorbent.

11. The method of claim 10, wherein the heat-treating is performed at a temperature of about 100° C. to about 600° C.

12. The method of claim 9, wherein the preparing includes the atomic ratio of Ba/Ti ranging from about 0.99 to about 1.05, and the average particle size ranges from about 10 nm to about 70 nm.

13. The method of claim 9, wherein the supplying includes the input gas stream having at least one of hydrogen, nitrogen, and methane.

14. The method of claim 9, wherein the contacting occurs at a temperature of about 150° C. to about 400° C.

15. The method of claim 9, wherein the contacting occurs at a temperature of about 100° C. to about 450° C.

* * * * *